United States Patent [19]

Sakai

[11] 3,719,108
[45] March 6, 1973

[54] HYDRAULIC CONTROL SYSTEM FOR AN AUTOMATIC TRANSMISSION

[75] Inventor: Ichio Sakai, Aichi-ken, Japan

[73] Assignee: Toyota Jidosha Kogyo Kabushiki Kaisha, Toyota-shi, Aichi-ken, Japan

[22] Filed: July 30, 1971

[21] Appl. No.: 167,621

[30] Foreign Application Priority Data

July 31, 1970 Japan .............................. 45/66565

[52] U.S. Cl. ................................................ 74/869
[51] Int. Cl. ............................................... B60k 21/00
[58] Field of Search ................................ 74/867–869

[56] References Cited

UNITED STATES PATENTS

| | | | |
|---|---|---|---|
| 3,546,973 | 12/1970 | Ohie et al. | 74/868 |
| 3,667,323 | 6/1972 | Irie | 74/868 X |
| 3,670,599 | 6/1972 | Magamatsu | 74/869 |

*Primary Examiner*—Arthur T. McKeon
*Attorney*—David Toren et al.

[57] ABSTRACT

In a hydraulic control system for the automatic transmission of a vehicle, an arrangement is provided for controlling the supply and release of pressurized oil to a first hydraulic servo for operating the vehicle under high speed conditions and to a second hydraulic servo for operating the vehicle under low speed conditions. The hydraulic control system includes oil passages connected to the first and second hydraulic servos, a speed-change valve, a timing valve and a manual valve. Based on a signal determined by the running speed of the vehicle the speed-change valve controls the flow of pressurized oil to the first hydraulic servo. The timing valve is in communication with both the first and second hydraulic servos and opens and closes flow to the second hydraulic servo. The timing valve includes a valve housing which forms separate oil chambers and a valve body which is displaceable within the housing for controlling the flow of oil therethrough. The manual valve has a number of positions for selecting the desired speed condition of the vehicle and the oil passages provide communication between the manual valve and the timing valve. Ordinarily, when operating under high speed conditions and the pressurized oil supplied to the first servo drops below a predetermined value corresponding to the engine output of the vehicle, the valve body is displaced so that pressurized oil is supplied to the second hydraulic servo through one of the oil chambers in the timing valve. However, if the valve body becomes stuck the usual supply of pressurized oil cannot be directed to the second servo and to assure that proper low speed conditions are provided, pressurized oil is supplied to the timing valve through the manual valve and then is conveyed through the proper oil chamber and oil passage to the second hydraulic servo.

1 Claim, 3 Drawing Figures

INVENTOR
ICHIO SAKAI

HYDRAULIC CONTROL SYSTEM FOR AN AUTOMATIC TRANSMISSION

BACKGROUND OF THE INVENTION

This invention relates to a hydraulic control system for the automatic transmission of a vehicle and, more particularly, to a hydraulic control circuit system for regulating the flow of oil to servo mechanisms in the hydraulic control system and for assuring proper operation of the control system even if some part should malfunction.

In general, in an automatic transmission when the change lever is shifted from a lower speed gear to a higher speed gear or shifted from a higher speed gear to a lower speed gear, one of the hydraulic servos must be switched from an oil release condition to an oil supply condition, while the other hydraulic servo must be changed from an oil supply condition to an oil release condition. In this case, if at the same time both servos should be in the oil release condition, overrunning of the engine and/or inoperative engine braking would result. On the other hand, if both servos are supplied with oil at the same time, an unfavorable phenomena, such as dragging of the friction engaging means and shock in speed change might occur. Thus, a smooth speed change requires a good timing of the oil release and supply of the servos in accordance with various conditions experienced in operation.

The present applicant has already proposed an effective means for achieving a smooth speed change. According to this means, a timing valve is provided in the oil line of the transmission valve and of two hydraulic servos, the timing valve is arranged to be actuated by pressurized oil corresponding to the opening of the engine throttle valve which is a parameter of the engine output, so that when supply pressure to the first hydraulic servo exceeds a certain value at the time of upshift as compared with the throttle valve, oil is discharged or released from the second hydraulic servo, while when the supply pressure drops below the certain value at the time of downshift, oil is supplied to the second hydraulic servo, thereby providing a suitable overlap of both hydraulic servos when a speed change takes place.

However, if the timing valve should become stuck and, as a result, inoperative, both of the hydraulic servos are in the oil supply condition at the time of upshift and cause simultaneous engagement of their associated friction engagement members which lock the output shaft and wheels, thus giving rise to great danger. Further, if the timing valve is inoperative during downshift no oil supply reaches the second hydraulic servo, and the engine brake is made inoperative in the low speed range.

SUMMARY OF THE INVENTION

The primary object of the present invention is to eliminate the disadvantages experienced in the past by improving the reliability of the hydraulic control circuit system.

According to the present invention, the hydraulic control system for the automatic transmission includes a timing valve with a number of oil chambers formed within a valve housing. First and second oil chambers are disposed in side by side relationship with the first oil chamber connected through an oil passage to the second hydraulic servo for alternatively supplying oil to or releasing it from the second servo. A manual valve is provided in the hydraulic control system and it includes an oil chamber to which pressurized oil is supplied from a pressure regulator valve only when the manual valve is in the second range or low speed condition. The oil chamber in the manual valve is connected to the second oil chamber in the timing valve, so that if the timing valve became stuck during downshifting to the second range, and the second oil chamber remains in communication with the first oil chamber instead of being closed off from the first oil chamber, then pressurized oil is supplied to the second hydraulic servo by means of a separate oil passage from the manual valve to the timing valve. From the manual valve the pressurized oil flows into the second oil chamber and then into the first oil chamber from where it flows through another oil passage into the second servo. By this arrangement any problems which might develop during downshifting if the timing valve becomes stuck, are avoided.

Thus, according to the present invention, the timing valve not only plays an important role in affording smooth speed changes but it also eliminates any adverse effects produced during downshifting if it should become stuck, thereby appreciably enhancing reliability of the hydraulic control circuit system.

DESCRIPTION OF A PREFERRED EMBODIMENT

Figure 1:
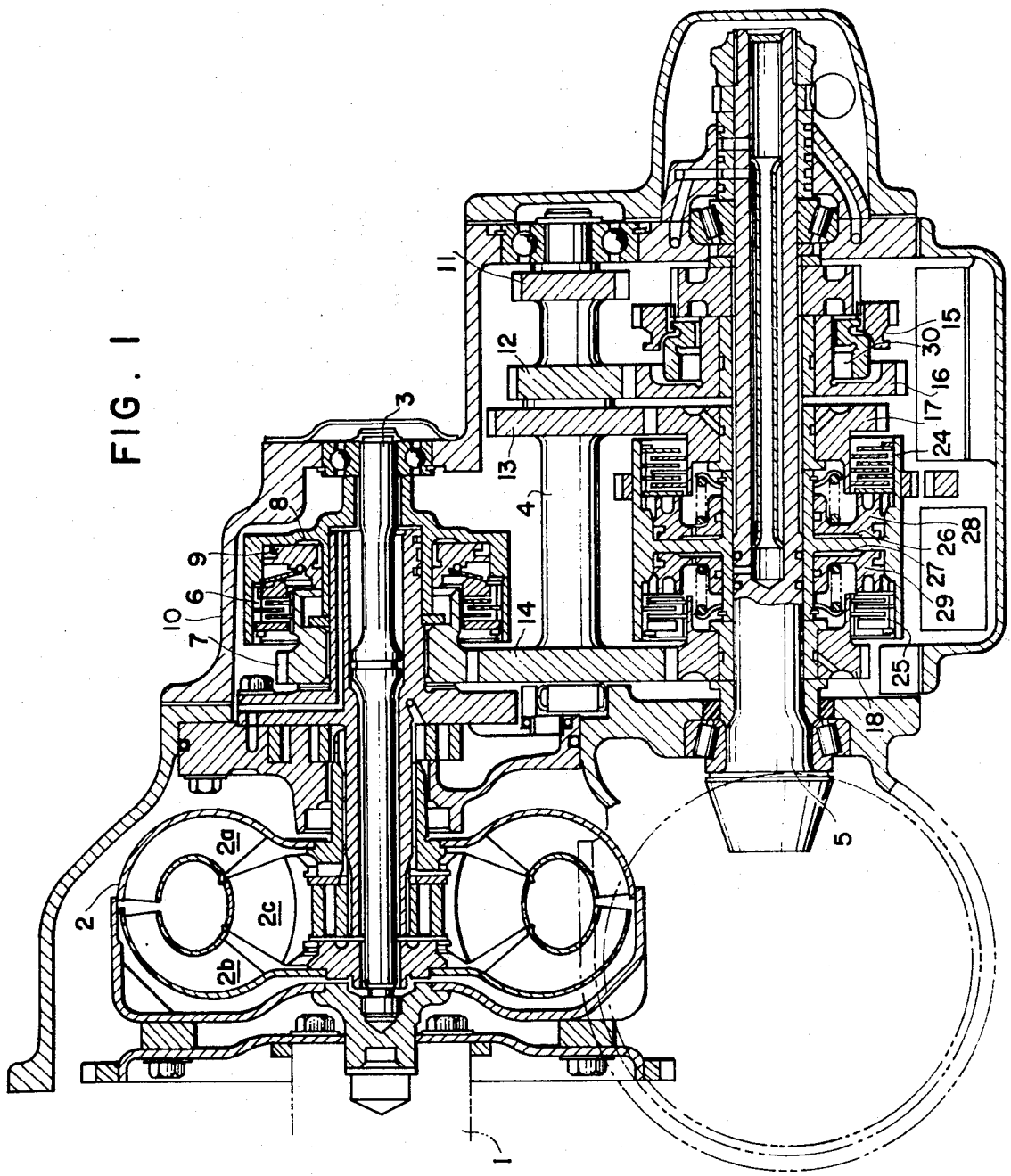
FIG. 1 illustrates in section an automatic transmission in which the present invention is embodied.
Figure 2:
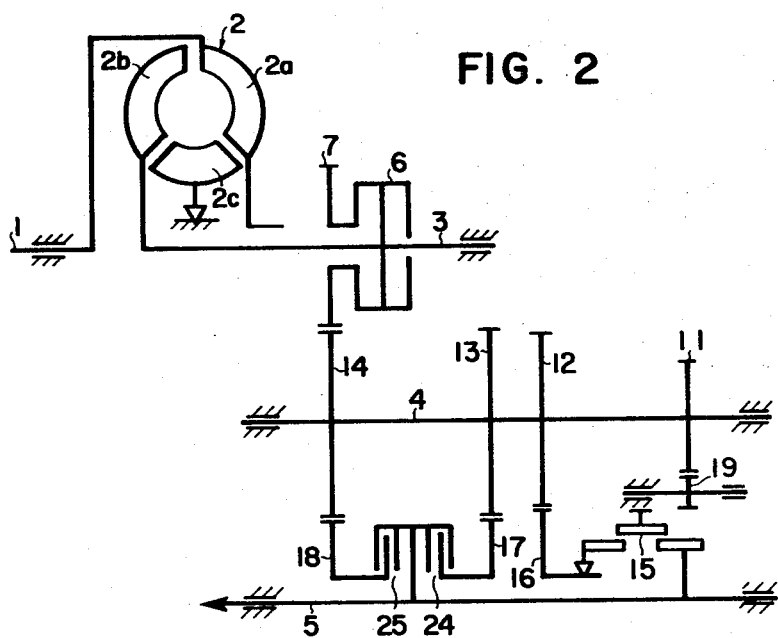
FIG. 2 is a diagram for describing the power flow in the transmission of FIG. 1.

In the drawing, FIG. 1 illustrates a three-forward-speed and one-reverse-speed gear transmission. The output shaft 1 of the engine (not shown) and the input shaft 3 of the transmission are arranged coaxially through a torque converter 2 in a gear case 10. The input shaft 3, intermediate shaft 4 and output shaft 5 are arranged in parallel relation.

The torque converter 2 consists of a pump 2a, a turbine 2b and a stator 2c. The pump 2a is rotatably connected to the output shaft 1 while the turbine 2b is rotatably connected to the input shaft 3, whereby the rotating force of the output shaft 1 is torque-converted to the input shaft 3. The input shaft 3 is also operatively connected to a transmitting gear 7 through a multiple disc clutch 6 of the friction engaging means. The multiple disc clutch means 6 comprises an oil chamber 8 of the hydraulic servo and a piston 9. When a servo oil pressure is supplied to the oil chamber of the clutch means, the clutch discs are brought into engagement. Further, removal of the servo oil pressure in the oil chamber releases the clutch engagement.

Coaxially and integrally mounted on the intermediate shaft 4 are, from right to left in succession, a speed change gear 11 for reverse drive, a speed change gear 12 for first speed, a speed change gear 13 for second speed and a speed change gear 14 for third speed. Among these gears, the third speed gear 14 engages with the transmitting gear 7 on the input shaft 3 so that the rotating force of the input shaft 3 is transmitted to the gear 14.

Rotatably mounted on the output shaft 5 are, from right to left in succession, a speed change gear 16 for first speed, a speed change gear 17 for second speed and a speed change gear 18 for third speed. These gears 16, 17 and 18 are meshed with the first, second and third speed gears 12, 13 and 14 on the intermediate shaft 4, respectively. The reverse drive gear 11 on the intermediate shaft 4 meshes with an idler gear 19 for reverse drive, supported rotatably in the gear case 10, and is also rotatably connected to a selective gear-meshing means 15 on the output shaft 5. Between the second and third speed gears 17 and 18 on the output shaft is disposed a multiple disc clutch 24 of the friction engaging means for connecting the second speed gear 17 to the output shaft 5. The multiple disc clutch 24 includes an oil chamber 26 of the second hydraulic servo and a piston 28. Another multiple disc clutch 25 includes an oil chamber 27 of the first hydraulic servo and a piston 29 is also provided for connecting the third speed gear 18 to the output shaft 5. The above described transmission of the present invention operates in the following manner.

First speed

The clutch 6 is actuated with the selective gear-meshing means 15 in a released state, and the rotation of the input shaft 3 is transmitted to the output shaft 5 at a reduced speed through the clutch 6, transmitting gear 7, speed change gear 14, intermediate shaft 4, speed change gear 12, speed change gear 16 and one-way clutch 30 in that order.

Second speed

The selective gear-meshing means 15 remains in the released state, and the clutch 6 and the clutch 24 for second speed are applied. The rotation of the input shaft 3 is transmitted to the output shaft 5 at a reduced speed through the speed change gear 13 on the intermediate shaft 4, speed change gear 17 and clutch 24.

Third speed

With the selective gear-meshing means 15 kept in the released state, the clutch 6 and the clutch 25 for third speed are actuated to transmit the rotation of the input shaft 6 to the output shaft 5 through the speed change gear 14 on the intermediate shaft 4, speed change gear 18 and clutch 25.

Reverse drive

The selective gear-meshing means 15 is brought into an operative state, with the selected gears in meshed relation, and the clutch 6 is actuated, whereby the rotation of the input shaft 3 is transmitted to the output shaft 5 in the reverse direction through the speed change gear 11 for reverse drive on the intermediate shaft 4, idler gear 19 and means 15.

Figure 3:
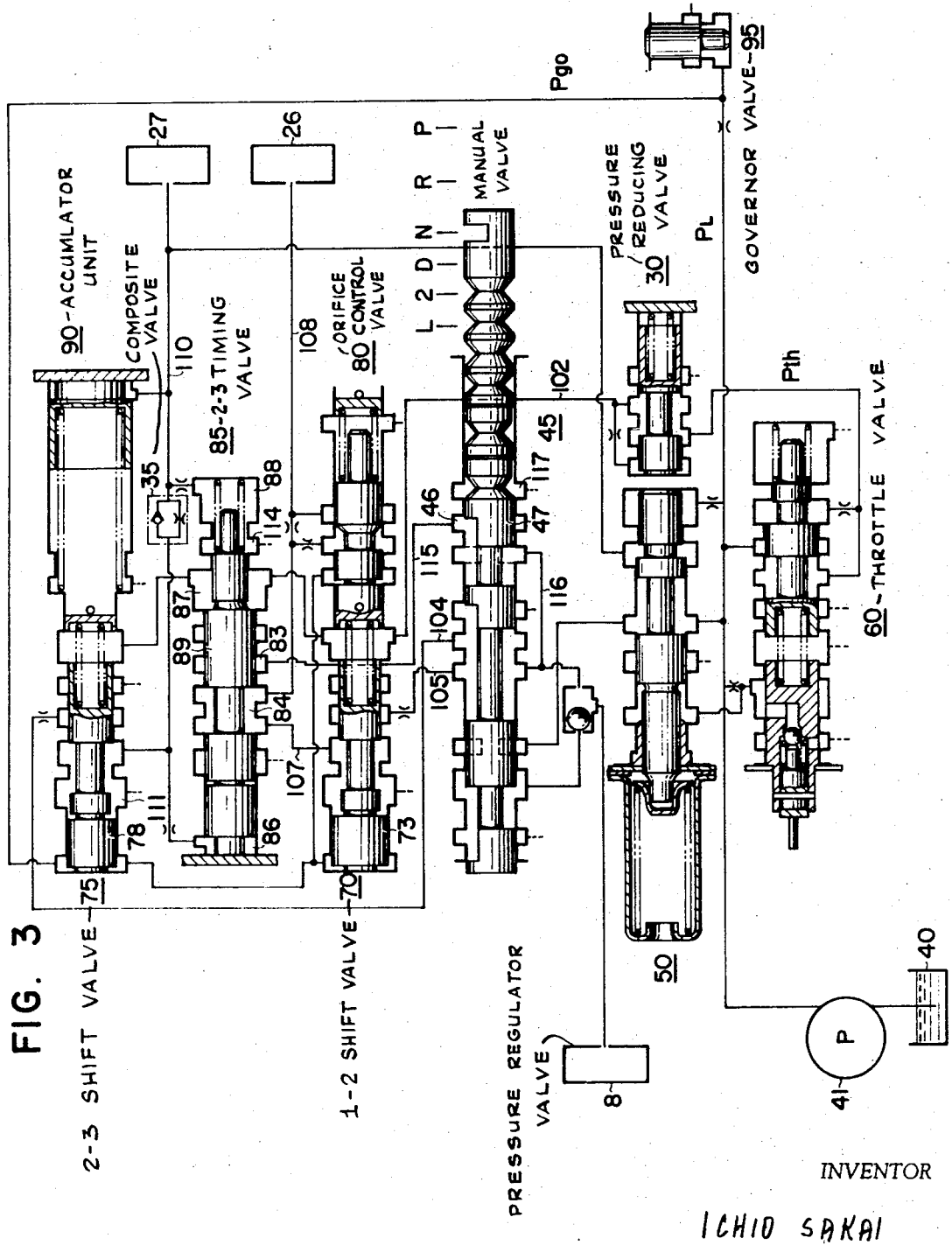
FIG. 3 shows a hydraulic control circuit of the transmission.

The speed change by the transmission mentioned above may be accomplished by supplying or releasing a hydraulic pressure (line pressure $P_L$) to or from the hydraulic servo oil chambers 8, 26 or 27 of the multiple disc clutches 6, 24 or 25, respectively. This operation is effected by a hydraulic control circuit system, as shown in FIG. 3, the description of which follows.

This hydraulic control circuit system consists substantially of the following components: an oil reservoir 40, an oil pump 41, a pressure regulator valve 50, a throttle valve 60, a manual valve 45, a 1-2 shift valve 70, an orifice control valve 80, a 2-3 shift valve 75 a 2-3 timing valve 85, an accumulator unit 90, a governor valve 95, a pressure-reducing valve 30 and a composite valve 35.

The oil pump 41, which is driven directly by an engine, draws oil from the oil reservoir 40 and establishes the line pressure $P_L$. The pressure regulator valve 50 is in pressure communication with the throttle valve 60 and is arranged so that a relatively low line pressure is developed when the throttle valve opening of the engine by the engine output is less than a predetermined value and a relatively high line pressure is developed when the opening is larger than the predetermined value. The pressure regulator valve 50 is also in pressure communication with the oil chamber 27 for third speed so that in the third speed condition where pressure oil exists in said oil chamber 27, a low line pressure $P_L$ is produced, while when no pressure oil exists in the oil chamber 27, a high line pressure $P_L$ is obtained, thus controlling the line pressure in conformity with the running condition of the vehicle.

The throttle valve 60 is link-connected to the accelerator pedal (not shown) and produces a throttle pressure $P_{th}$ which is increased corresponding to the throttle valve opening of the engine. The governor valve 95 is driven by the output shaft 5 of the transmission and produces a governor pressure $P_{go}$ corresponding to the running speed of the vehicle. The manual valve 45 is linked to a shift lever (not shown) and may be shifted in six positions (L,2,D,N,R,P). It distributes the line pressure $P_L$, controlled to a desired level by the pressure regulator valve 50, to a hydraulic servo circuit to obtain a required shifting condition.

The 1-2 shift valve 70 is operated in accordance with the pressure difference between the throttle pressure $P_{th}$ acting to the right side and the governor pressure $P_{go}$ acting to the left side, so as to effect shifting between the first and second speed of the transmission in accordance with the running condition of the vehicle at the D- and 2-positions of the manual valve 45. When the running speed of the vehicle is elevated and the acting force provided by the governor pressure $P_{go}$ exceeds that by the throttle pressure $P_{th}$, the valve body 73 moves to the right to connect the oil passage 105 from the manual valve 45 to the oil passage 107 for supplying the line pressure $P_L$ to the oil chamber 26 of the clutch 24 for second speed, thereby producing the second speed condition of the transmission.

The orifice control valve 80 receiving the action of the governor pressure $P_{go}$ controls the flow rate of the line pressure $P_L$ supplied to the oil chamber 26 of the clutch means 24 at the time of shifting to the second speed, thereby mitigating the shock of speed change. The 2-3 shift valve 75 operates, in a manner similar to the 1-2 shift valve 70, that is in accordance with the pressure difference between the throttle pressure $P_{th}$ and the governor pressure $P_{go}$ so as to perform shifting between the second speed and the third speed of the transmission at the D-position of the manual valve 45. When the force developed by the throttle pressure $P_{th}$ is higher than that of the governor pressure $P_{go}$, the valve body 78 stays in its left hand position as shown in FIG. 3 and the oil passage 110 to the oil chamber 27 of the clutch means 25 for third speed is connected with a pressure release circuit 111. Therefore, the transmission is in the first or second speed condition under the action of the 1-2 shift valve 70. When the vehicle running speed is increased and the force developed by the governor pressure $P_{go}$ is greater than of the throttle pressure $P_{th}$, the valve body 78 is moved to its right position, connecting the oil passage 104 from the manual valve 45 and the oil passage 110 to the oil chamber 27 of the clutch means 25 for third speed, supplying the line pressure $P_L$ to the oil chamber 27, thereby effecting change-over from the second speed to the third speed condition of the transmission.

The accumulator unit 90, which is provided in the oil passage 110 to the oil chamber 27 of the clutch means 25 for third speed, is designed to assure slow application of the line pressure $P_L$ to the servo oil chamber 27 in accordance with volume variation.

Now, the 2-3 timing valve 85 and composite valve 35, which are the key elements of the present invention will be described in detail.

In the 2-3 timing valve 85, an oil chamber 86 located on the left side of the valve body 89, as viewed in FIG. 3 is arranged to receive the pressurized oil in the oil passage 110 leading to the oil chamber 27 of the clutch 25 for third speed, and an oil chamber 87 on the right side is connected to the oil passage 102 containing the throttle pressure $P_{th}$ while another oil chamber 88 further to the right side is connected to the oil chamber 27 through the oil passage 110. In addition, a release circuit 114 connected to the timing valve 85 moves the valve body 89 to its left-hand position where the circuit is open and when closed the valve body is moved to its right-hand position by the action of the pressurized oil in the oil chamber 86. The 2-3 timing valve 85 also has an oil chamber 84 positioned along a middle part of the valve body 89 and it is connected through an oil passage 107 to the 1-2 shift valve 70, so that oil pressure is supplied to the oil chamber 26 of the clutch means 24 for second speed through communication between the oil chamber 84 and oil passage 108 leading to the oil chamber 20. Another oil chamber 83 is arranged next to and on the right side of the oil chamber 84.

The manual valve 45 has an oil chamber 46 connected to the oil chamber 83 through an oil passage 115, and an oil passage 116 to which the line pressure $P_L$ is supplied is connected to one side of a suitably formed valve body 47 and a pressure release circuit 117 is connected to the other side of the valve body. When this manual valve 45 is in the drive range (D-position), the oil passage 115 and pressure release circuit 117 communicate with each other due to the position of the valve body 47, while when the manual valve is in the second range 2-position), the oil passages 115 and 116 are in communication.

The composite valve 35 is provided in the oil passage 110, which supplies pressurized oil to the oil chamber 27 of the clutch 25 for third speed, at a position in front of the location where the passage is connected to the oil chamber 88 of the 2-3 timing valve 85. Thus, the composite valve 35 is arranged so as to produce an orifice effect when pressurized oil is supplied to the oil chamber 27 and to eliminate such effect when oil is released from the oil chamber 27.

Now, when the transmission is in the second speed condition, the valve body 89 of the 2-3 timing valve 85 stays in its left position to keep the oil chamber 84 open since no line pressure exists in the oil passage 110, and the line pressure $P_L$ supplied from the 1-2 shift valve 70 through the oil passage 107 is led to the oil chamber 26 via the oil passage 108 to engage the clutch 24 for a second speed, thereby producing a second speed condition. The, when the manual valve 45 is switched to the drive range (D-position) to connect the oil passage 115 with the pressure release circuit 117 to allow supply of line pressure $P_L$ to the oil passage 110, pressurized oil in the oil chamber 27 is given an orifice effect by the composite valve 35, causing a slow rise of oil pressure due to the action of the accumulator means 90. When oil pressure in the oil chamber 86 exceeds a predetermined value, the valve body 89 of the 2-3 timing valve 85 moves to the right and closes the oil chamber 84 while the oil chamber 83 is opened so that oil pressure in the oil chamber 26 is released through the pressure release circuit 117 of the manual valve 45 by way of the oil passages 108 and 115 to bring the clutch 24 for second speed into a released state, and at the same time the 2-3 timing valve 85 closes the pressure release circuit 114 of the oil chamber 88 due to the displacement of the valve body 89 to effect full-scale rise of oil pressure in the oil chamber 27 for perfectly engaging the clutch 25 for third speed, thereby obtaining a third speed condition.

During this upshifting operation, even if the line pressure $P_L$ is supplied to the oil passage 110 and raised to a predetermined level, if the 2-3 timing valve 85 should become stuck and keep the valve body 89 inoperative in its left position, the oil chamber 26 of the clutch 24 for second speed will remain in communication with the oil passages 107 and 108 so that no pressure release is effected. However, according to the present invention, the right hand oil chamber 88 of the 2-3 timing valve 85 is arranged to guide the line pressure $P_L$ in the oil passage 110 into the pressure release circuit 114 through the composite valve 35, thus preventing oil pressure in the oil chamber 27 from rising above a certain prescribed level to prevent engagement of the clutch 25 for third speed, thereby actually stopping the upshift to obviate the simultaneous engagement that causes troubles.

In case the transmission is downshifted from third speed to second speed, the manual valve 45 is switched to a low speed condition or the second range (2-position) to connect the oil passages 115 and 116, and at the same time oil pressure in the oil chamber 27 is quickly released by the action of the 2-3 timing valve 85 without any orifice effect by the composite valve 35 in the oil passage 110, thereby releasing the engagement of the clutch 25 for third speed. Thereupon, the valve body 89 in the valve housing of the timing valve, which has been positioned on the right side of the 2-3 timing valve 85, is biased to the left side of the valve housing by the action of throttle pressure, thus establishing communication between the oil passages 108 and 107 through oil chamber 84 to supply line pressure $P_L$ to the oil chamber 26 and to effect engagement of the clutch 24 for second speed, thereby producing the second speed condition. During this downshifting operation, if the 2-3 time valve 85 becomes stuck so that the valve body 89 can not move from its right-side position even if the engagement of the clutch 25 for third speed is released, the line pressure $P_L$ is supplied to the oil passage 108 flowing in turn through the oil passage 116, the manual valve 45, the oil passage 115, the oil chambers 83, 84, to supply pressurized oil pressure to the oil chamber 26 the same as in normal operation to ensure engagement of the clutch 24 for second speed, thus allowing achievement of the second speed condition even though the timing valve does not operate properly.

As viewed above, it is possible with the present invention to perfectly make up any deficiency caused by trouble in the timing valve introduced for achieving a most favorable speed change.

While a specific embodiment of the invention has been shown and described in detail to illustrate the application of the inventive principles, it will be understood that the invention may be embodied otherwise without departing from such principles.

What is claimed is:

1. In an automatic transmission for a vehicle comprising a speed change gearing, at least a first frictional engagement means and a second frictional engagement means each associated with said speed change gearing, a first hydraulic servo means for actuating said first frictional engagement means, a second hydraulic servo means for actuating said second frictional means, wherein the improvement comprises a hydraulic control circuit system for supplying pressurized oil to said first servo means and releasing pressurized oil from said second servo means under high speed conditions of the automatic transmission and for releasing pressurized oil from said first servo means and for supplying pressurized oil to said second servo means under low speed conditions of the automatic transmission, said hydraulic control circuit system comprising oil passages connected to said first and second servo means and a speed-change valve means, a timing valve means, and a manual valve which are connected to at least certain of said oil passages, said speed-change valve means arranged to receive a signal established by the running speed of the vehicle and based on the signal to effect a switching of the pressurized oil in said first servo means between the supply and release condition, said timing valve comprising a valve housing forming at least a first oil chamber and a second oil chamber positioned adjoining said first oil chamber and another oil chamber in communication with said first servo means, said first oil chamber arranged in communication through one of said oil passages with said second servo means, a valve body displaceable within said valve housing between one position for affording communication between said first and second oil chambers when pressurized oil is released from said second servo means and another position for preventing communication between said first and second oil chambers for supplying pressurized oil through said first oil chamber to said second servo means when the pressure of the oil supplied to said first servo means drops below a predetermined value relative to a signal corresponding to the engine output of the vehicle, said manual valve arranged to select the desired speed condition of the vehicle and having a plurality of positions including a position for selecting low speed conditions corresponding to the low speed conditions under which pressurized oil is supplied to said second servo means, said second oil chamber arranged in communication with said manual valve through another one of said passages when said manual valve is positioned for low speed conditions, said valve body being displaceable into position for regulating communication between said first and second oil chambers and when under high speed conditions the pressurized oil supplied to said first servo means drops below a predetermined value corresponding to the engine output of the vehicle so that if said valve body becomes stuck when it is to be displaced and cannot prevent communication between said first and second oil chambers when low speed conditions are to be established then pressurized oil is supplied to said second oil chamber from said manual valve for passage into said first oil chamber and then into said second servo means for obtaining low speed conditions.

* * * * *